US012291431B2

(12) United States Patent
Chero

(10) Patent No.: US 12,291,431 B2
(45) Date of Patent: May 6, 2025

(54) FIREFIGHTER'S UTILITY DEVICE

(71) Applicant: MULTIPURPOSE WEBBING INC., Babylon, NY (US)

(72) Inventor: Gregory Chero, Babylon, NY (US)

(73) Assignee: Multipurpose Webbing Inc., Babylon, NY (US)

( * ) Notice: Subject to any disclaimer, the term of this patent is extended or adjusted under 35 U.S.C. 154(b) by 1007 days.

(21) Appl. No.: 17/339,255

(22) Filed: Jun. 4, 2021

(65) Prior Publication Data

US 2021/0380376 A1 Dec. 9, 2021

Related U.S. Application Data

(60) Provisional application No. 63/034,488, filed on Jun. 4, 2020.

(51) Int. Cl.
*B66C 1/12* (2006.01)

(52) U.S. Cl.
CPC .................................... *B66C 1/12* (2013.01)

(58) Field of Classification Search
CPC .......... B66C 1/12; B66C 1/18; A62B 35/0025
See application file for complete search history.

(56) References Cited

U.S. PATENT DOCUMENTS 1,490,066 A * 4/1924 Carr .......................... A45F 3/14 224/159
11,577,103 B1 * 2/2023 Candela .................. A62B 5/00
2004/0182644 A1 * 9/2004 Kotarski ................ A61G 1/044 182/3
2004/0194733 A1 * 10/2004 Bremm ................ A01K 27/003 119/770
2007/0261213 A1 * 11/2007 Nolan ...................... A45F 3/14 24/300
2015/0027808 A1 * 1/2015 Baillargeon ....... A62B 35/0025 182/19
2015/0259931 A1 * 9/2015 Doerscher, Sr. .......... B66C 1/12 294/81.1

* cited by examiner

*Primary Examiner* — Stephen A Vu
(74) *Attorney, Agent, or Firm* — Daniel T. Weglarz, Esq.; Long Island Patent Attorney, P.C.

(57) ABSTRACT

A utility device tailored for firefighting, rescue, and life safety applications. The utility device has a tether section, a handle, and a fastener. The handle is connected to a proximal end of the tether section and the fastener is connected to a distal end of the tether section. Ideally, the tether section is formed of webbing and the handle is defined by a loop formed in the proximal end of the tether section. The fastener preferably comprises a carabiner with a spring-loaded gate and a captive eye frame. The utility device is operative in both a connected loop state, in which the fastener is attached to the handle, and an elongated state, in which the fastener is not attached to the handle. The utility device is a compact, portable, and versatile tool capable of facilitating a wide range of standard firefighting practices.

11 Claims, 4 Drawing Sheets

FIREFIGHTER'S UTILITY DEVICE

CROSS-REFERENCE TO RELATED APPLICATIONS

This application claims the benefit of and incorporates by reference U.S. provisional patent application Ser. No. 63/034,488 filed Jun. 4, 2020.

STATEMENT REGARDING FEDERALLY SPONSORED RESEARCH OR DEVELOPMENT

None

Field of the Invention

This invention relates generally to rescue equipment and, more particularly, to a utility device having multiple functions for rescue operations.

BACKGROUND OF THE INVENTION

Description of the Prior Art

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Webbing is a strong, woven fabric that has several advantages over rope. Typically, webbing is available in flat strips and tubular options. Flat webbing is readily available in widths ranging from 0.4 inches to 3.0 inches, with 1.0-inch-wide webbing commonly exhibiting a breaking strength in excess of 3,000.00 pounds. Webbing may be constructed from various materials, including hemp; cotton; linen; synthetic fibers, such as nylon, polypropylene, and polyester; and high-strength material, such as Dyneema and Kevlar.

The use and design of webbing for safety and rescue applications is well established, and carrying webbing during emergency operations is common practice among firefighters. In fact, webbing is one of the most common tools firefighters carry, and for good reason. It is lightweight, compact, and durable.

Firefighters routinely carry a length of webbing as an indispensable part of their rescue gear. Often times, the length of webbing is fashioned into a continuous loop for greater functionality, which is traditionally accomplished by tying the two ends of the length of webbing together by means of a water knot. The webbing loop can be used for extracting a downed firefighter or unconscious victim from a dangerous environment. This may be performed using the webbing loop by forming a girth hitch around the downed firefighter or through his harness. In this manner, the webbing loop provides handles for a secure grip while also providing some distance from the downed firefighter to allow for enhanced mobility.

Similarly, the webbing loop with the aid of a girth hitch provides a firefighter with a safe and effective means for hoisting tools to a roof or other location, and transporting tools up and down a ladder, in that it frees his hands for gripping the rungs of the ladder and enables him to maintain better balance.

Another extremely practical use of the webbing loop for firefighters is that of a hasty harness. This enables the webbing loop to be formed into a temporary lifting harness. This sort of makeshift harness allows for self-rescue and assisted rescue from an elevated area, and can facilitate the performance of firefighter drag techniques on unconscious victims. Webbing has an advantage over rope for constructing harnesses in that it lies flat against the body, thus reducing the pressure applied by the harness to the user.

Another piece of gear commonly carried by firefighters is a length of utility cord, rather than webbing. However, such cord has several disadvantages in comparison to webbing and is not easily carried by firefighters during rescue operations.

While there are other additional uses for webbing or utility cord in the context of rescue operations not elaborated on here, these tools have significant drawbacks and can be greatly improved upon for enhanced efficiency and effectiveness in firefighting applications. One particular aspect that can be improved upon is versatility.

Although firefighters have long relied on a length or loop of webbing or utility cord to serve multiple functions, the limited versatility of such prior art tools still leave much to be desired. For instance, webbing or utility cord used in the traditional manner cannot be attached to drag devices carried by firefighters as quickly as desired, their length is not easily adjustable, and multiple units cannot be easily combined with each other. These are merely a few of the shortcomings inherent in prior art webbing and utility cord rescue devices.

Thus, there remains a need for a rescue apparatus capable of serving multiple functions and that can be easily carried and rapidly deployed.

SUMMARY OF THE INVENTION

The present invention is a rescue apparatus having enhanced function and greater versatility over prior art webbing and utility cord products currently employed in standard fire rescue practice. The utility device of the present invention includes a tether section, a handle, and a fastener. The handle is connected to a proximal end of the tether section and the fastener is connected to a distal end of the tether section. Ideally, the tether section is formed of webbing and the handle is defined by a loop formed in the proximal end of the tether section. Alternatively, the handle may be a detachable handle, and may include a grip. The fastener preferably comprises a carabiner with a spring-loaded gate, and may include a captive eye for the tether section to connect to.

The utility device is operative in both a connected loop state, in which the fastener is attached to the handle, and an elongated state, in which the fastener is not attached to the handle. The utility device is also capable of being joined with additional units of the utility device for use in combination so as to offer even greater versatility.

It is an object of the present invention to provide a utility device that is compact, portable, versatile, and capable of facilitating a wide range of standard firefighting practices. The present invention accomplishes that by providing a utility device that is tailored for firefighting, rescue, and life safety applications.

These and other objects will be apparent to one of skill in the art.

DETAILED DESCRIPTION OF THE INVENTION

Figures 1, 2:
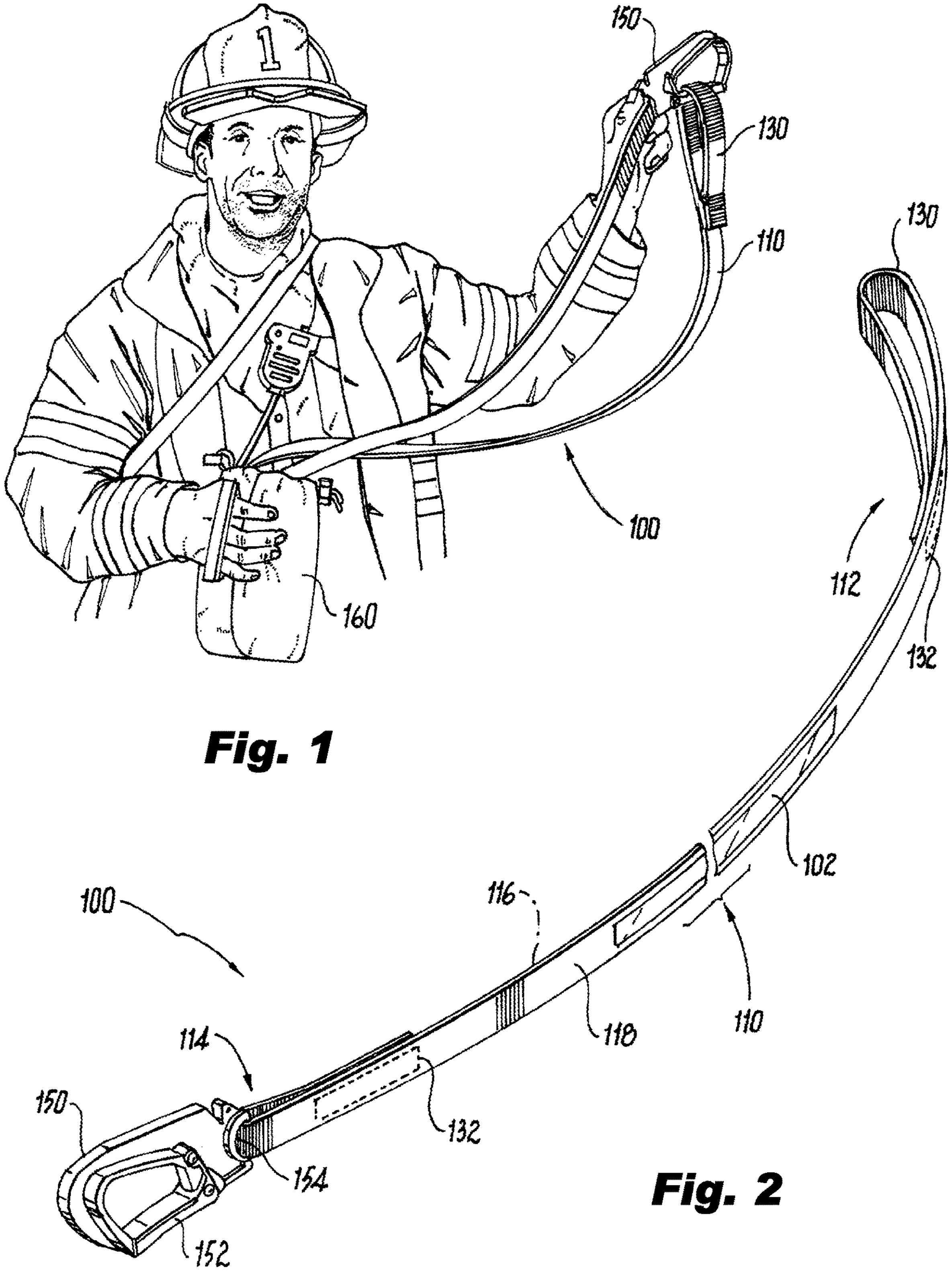
FIG. 1 front perspective view of a firefighter's utility device built in accordance with the present invention shown attached to a second unit of the same device and partially removed from a storage case by a user.
FIG. 2 is a front perspective view of a firefighter's utility device built in accordance with the present invention shown in an elongated state.

The present invention described herein provides for a rescue apparatus having enhanced function and greater versatility over prior art webbing and utility cord products currently employed in standard fire rescue practice. As will become apparent throughout this disclosure, the arrangement of the elements of the invention and their dimensions specified herein provide for an incredibly valuable tool for firefighters. Moreover, the invention lends itself perfectly to standard fire service practices and techniques while embodying an intentionally simplistic design custom tailored to facilitate real-world use in the field.

While the present invention is disclosed herein against the backdrop of firefighting and the potential applications in which such a device would be useful to firefighters, it is contemplated that the invention may be equally valuable in other applications, where it may serve any number of roles, such as search and rescue equipment in other sectors, safety gear, and sporting goods equipment.

For the sake of brevity, this disclosure refers generally to "webbing," but it is understood that the invention is alternatively capable of use with rope, straps, cable, or other types of cordage, whether in the prior art or proprietary, in place of or in addition to webbing.

The ensuing description provides preferred exemplary embodiments only, and is not intended to limit the scope, applicability, or configuration of the disclosure. Rather, the ensuing description of the preferred exemplary embodiments will provide those skilled in the art with an enabling description for implementing preferred and exemplary embodiments of the disclosure. It is apparent to a person of ordinary skill in the art, however, that the present invention may be practiced through many embodiments other that those illustrated. It should be understood that various changes may be made in the function and arrangement of elements without departing from the spirit and scope of the invention as set forth in the appended claims.

For the purposes of this disclosure, certain directional terms that may be used herein are used to facilitate the description of the invention. Unless otherwise specified or made apparent by the context of the discussion, such terms and the like should be interpreted with reference to the figure(s) under discussion. Such terms are not intended as a limitation on the position in which the invention or components may be used. It is contemplated that the components of the invention may be easily positioned in any desired orientation for use. Likewise, numerical terms, such as "first" and "second" are not intended as a limitation or to imply a sequence, unless otherwise specified or made apparent by the context of the discussion.

A number of terms may be clarified to facilitate understanding of the invention. The term "operatively connected" is understood to include a linking together of the portions under consideration and may include a physical engagement and/or a functional or operational connection.

Referring now to the drawings and in particular FIGS. 1, 2, 3, 4, 5, 6, and 7, a utility device 100 for rescue use is shown having a tether section 110, a handle 130, and a fastener 150.

The tether section 110 has a proximal end 112 at which the handle 130 is positioned, and a distal end 114 at which the fastener 150 is positioned. In the preferred embodiment, the tether section 110 is a substantially flat member with a planar bottom surface 116, a planar top surface 118, and a generally rectangular cross section. The tether section 110 may be at least 0.50 inches and at most 3.00 inches wide. Embodiments of the tether section 110 may have a width of 1.00 inch. Embodiments of the tether section 110 may have a length of 22.00 feet. Embodiments of the utility device 100 have a maximum total outstretched length (including the handle 130 and the fastener 150) of 22.00 feet.

The tether section 110 and the handle 130 may be formed from a single length of material, as shown in FIG. 2, or out of two structures that are operatively connected. Regardless, the tether section 110 and the handle 130 may be made of webbing as shown in the figures.

Alternatively, the tether section 110 and the handle 130 may be constructed of rope, straps, cable, or other types of cordage, whether in the prior art or proprietary. However, the properties of webbing make it particularly well-suited for the intended uses contemplated herein. For instance, it is strong, durable, compact, and flexible. Additionally, since it is a flat strap, it reduces the pressure felt by the force applied to a user's body when used to fashion a harness. The flat shape of webbing also helps it resist abrasion when attached to or sliding through a carabiner.

It is further noted that the tether section 110, the handle 130, the fastener 150, or any portion of the utility device 100 may be made of, coated with, or treated with a flame-resistant, flame-retardant, or non-corrodible material. For example, in one embodiment the tether section 110 and the handle 130 are made of flame-resistant or flame-retardant material and the fastener 150 has at least its exterior surface made up of non-corrodible material. Such characteristics can be very useful in the operating conditions posed by fire service use in which the device may be exposed to open flames, extreme heat, or chemicals that could degrade the integrity of materials composing the utility device 100.

As shown in the figures, the utility device 100 comprises a handle 130 operatively connected to the tether section 110 at the tether section's proximal end 112. In the preferred embodiment, a portion of the tether section 110 is fashioned into a loop at the proximal end 112 to form the handle 130. In this manner, the tether section 110 and the handle 130 provide an integrated device. The loop may be formed by any method known in the prior art, but preferably by sewing the distal end 112 of the tether section 110 to a point on the tether section 110 between the distal end 112 and the proximal end 114, as illustrated in FIG. 1. This sewn loop may be secured with stitching 132 in a manner that meets standard requirements for rescue and life safety equipment.

Preferably, the handle 130 defines a loop so dimensioned to easily fit around an average-sized adult hand when wearing a glove of the style donned by firefighters. Thus, a gloved hand may easily enter and exit the loop formed by the handle 130 to engage and disengage with the handle 130 without impediment. Embodiments of the handle 130 may define a loop having a circumference that is at least 13.00 inches and at most 15.00 inches. For example, the handle 130 may define a loop having a circumference of 14.00 inches.

In some embodiments, the handle 130 includes a grip 134, which makes the handle 130 easier to grasp. Ideally, such a grip 134 is rigid and cylindrical. Such a grip 134 is ideal for situations in which the tether section 110 will be subjected to a particularly high tensile force, thereby exerting a relatively greater force on the user's hand, such as when dragging extra heavy loads. In this regard, the grip 134 operates to reduce the pressure felt on the user's hand by distributing the forces over an increased surface area. While providing a more ergonomic handle 130 and greater dragging capability, such a grip 134 also increases the size of the utility device 100, thus reducing its portability. For this reason, it should be recognized that such a grip 134 is not incorporated in the preferred embodiment.

Figure 5:
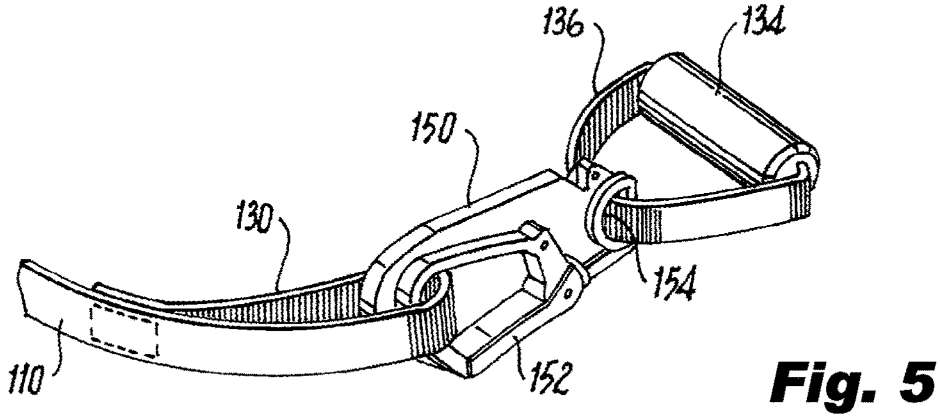
FIG. 5 is a front perspective view of a firefighter's utility device built in accordance with the present invention shown having a detachable handle with a grip.

In some embodiments, the utility device 100 may comprise a detachable handle 136 that is not formed from the tether section 110, but rather that is operatively connected to the tether section 110 with a fastener 150, as illustrated in FIG. 5. Such detachable handle 136 operates to selectably attach to the proximal end 112 of the tether section 110 or, alternatively, selectably attach to the handle 130 so that the handle 130 need not be removed from the utility device 100 in order to operatively connect the detachable handle 136. The detachable handle 136 may be fitted with a grip 134 in addition to or in lieu of the handle 130 being fitted with a grip 134. Ideally, such a grip 134 is rigid and cylindrical.

The fastener 150 may be a fastener known in the prior art or a proprietary fastener. In the preferred embodiment, the fastener 150 is a carabiner, as shown in FIG. 2. There are several carabiner designs in the prior art that would be suitable for use as the fastener 150 in the instant invention. For example, the fastener 150 may be a D-shaped carabiner, an offset-D-shaped carabiner, an oval-shaped carabiner, a pear-shaped carabiner, or other carabiner. Further, the fastener 150 may comprise a carabiner having a wire gate or a solid gate. Moreover, the gate may feature automatic locking or manual locking, or be of the non-locking variety.

It is recognized that the fastener 150 may utilize various other closure mechanisms 152, such as those used in pin shackles, threaded shackles, twist shackles, snap shackles, soft shackles, and other known shackles. Alternatively, the fastener 150 may even forgo a closure mechanism 152 altogether (in such embodiments, the fastener 150 would essentially resemble a hook, such as a firefighter anchor hook). However, the preferred embodiment employs a carabiner having a closure mechanism 152 that includes a gate that is spring biased to the closed position.

The fastener 150 in the preferred embodiment employs a D-shaped captive eye carabiner having a captive eye frame made up of a gated compartment and a captive eye portion 154, and a spring-loaded solid gate, as shown in FIG. 2. This provides a self-closing gate while accommodating fast and easy one-handed operation, even when wearing gloves, by simply depressing the gate with the thumb while gripping the carabiner's frame. The captive eye portion 154 provides a separate attachment point for the tether section 110, thus secluding the tether section 110 in an isolated compartment of the fastener 150 to diminish any potential interference with other webbing, ropes, or objects that the fastener 150 will engage with. Preferably, the manner in which the tether section 110 is attached to the fastener 150 is such that the distal end of the tether section 110 passes through the captive eye portion 154 of the captive eye carabiner and operatively connects to a more proximal location of the tether section 110 forming a loop at the distal end of the tether section 110 that is operatively connected to the captive eye portion 154 of the captive eye carabiner.

The captive eye design also helps maintain the fastener 150 in its proper orientation and prevent misalignment and cross-loading. This is critical because carabiners are designed to be loaded in line with their major axis. On the other hand, they are weakest and most prone to failure when loaded in line with their minor axis across the gate. In rescue and emergency applications, where equipment failure can yield devastating consequences, equipment design that inherently improves reliability and minimizes failure rate is crucial.

In embodiments in which the fastener 150 does not include a captive eye portion 154, ideally the tether section 110 is operatively connected to the fastener 150 securely enough to resist any tendency the fastener 150 may have to rotate with respect to the tether section 110. This facilitates maintaining the fastener 150 in its intended orientation for use, in which its major axis is substantially parallel to the central axis that spans the length of the tether section 110 and aligned with the direction of force when under load. It also serves to ensure the fastener 150 remains in a predictable orientation, thus reducing potential fumbling and the need to manipulate the fastener 150 when working its gate. Of course, the captive eye also serves this same purpose. In either version, the utility device 100 is designed for rapid deployment.

In some embodiments, the fastener 150 is removable from the tether section 110. This allows for replacement of the fastener 150, such as after it has sustained an impact and it becomes questionable whether its integrity has been compromised.

Figure 6:
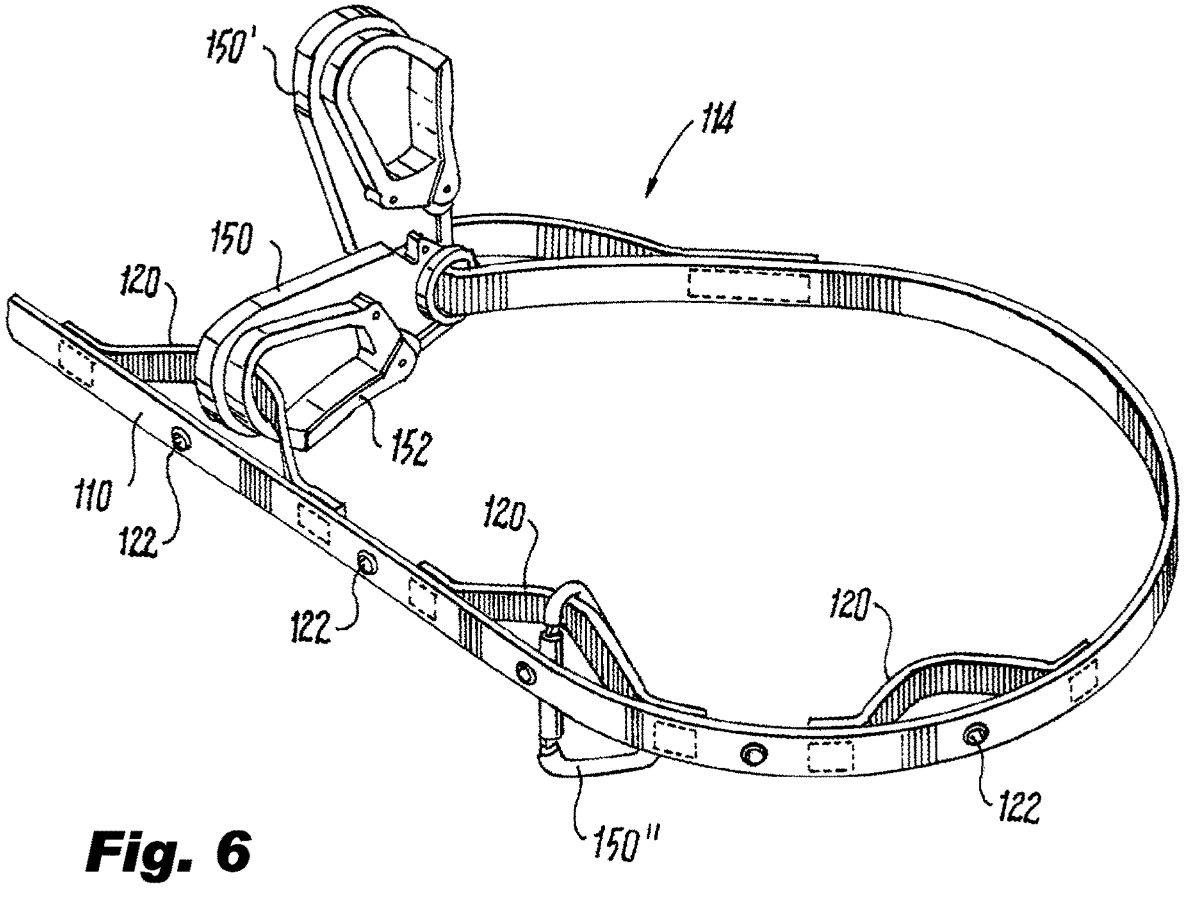
FIG. 6 is a front perspective view of a firefighter's utility device built in accordance with a double fastener embodiment of the present invention, shown with a carabiner attached to a fastening point.
Figure 7:
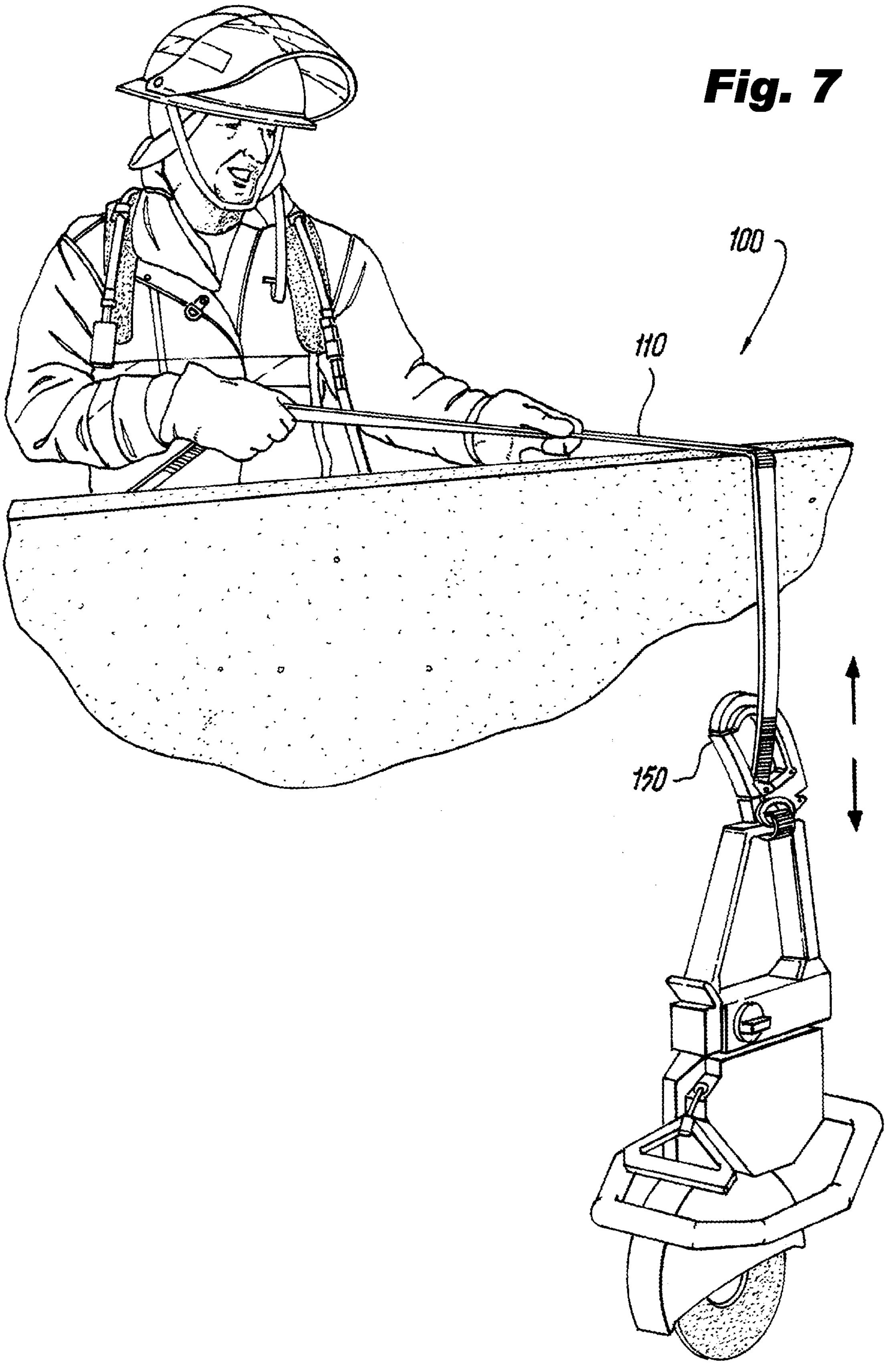
FIG. 7 is a front perspective view of firefighter's utility device built in accordance with the present invention shown being used to hoist gear.

Yet another embodiment comprises two or more fasteners 150 operatively connected to the distal end 114 of the tether section 110 to offer redundancy. Ideally, such an embodiment includes two fasteners 150 and 150'. If these fasteners are carabiners that do not have a captive eye portion 154, they should be operatively connected to the distal end 114 of the tether section 110 and oriented with respect to each other in an opposite and opposed manner, which is a standard safety protocol in the use of carabiners. If the two fasteners are captive eye carabiners as shown in FIG. 6, they are ideally operatively connected to the tether section 110 such that they each have their closure mechanism 152 facing opposite directions with respect to each other, as FIG. 6 illustrates.

Figure 3:
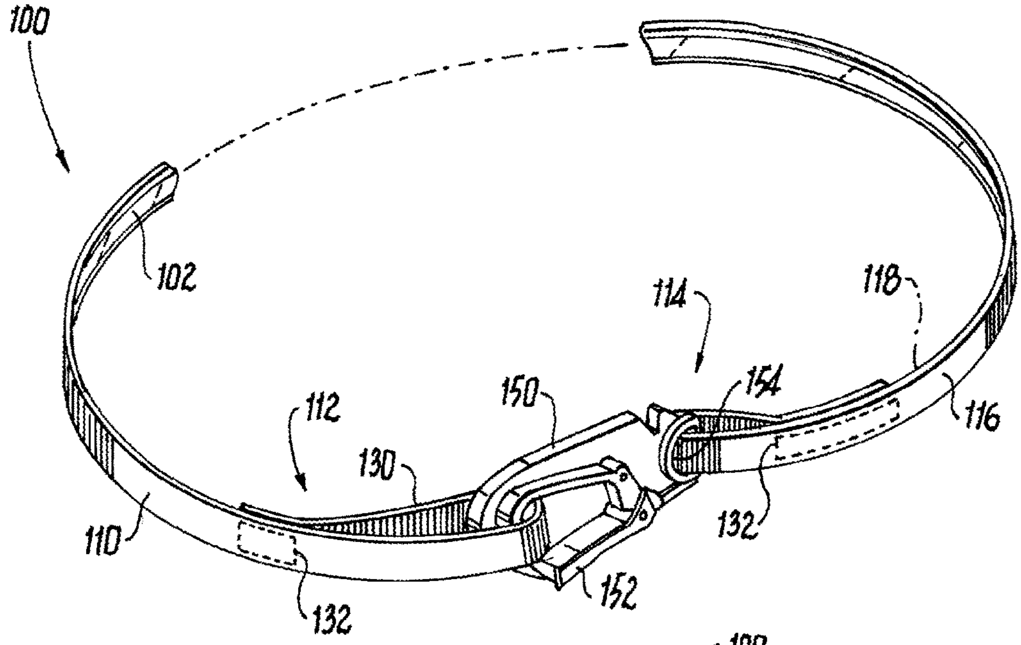
FIG. 3 is a front perspective view of a firefighter's utility device built in accordance with the present invention shown in a connected loop state.
Figure 4:
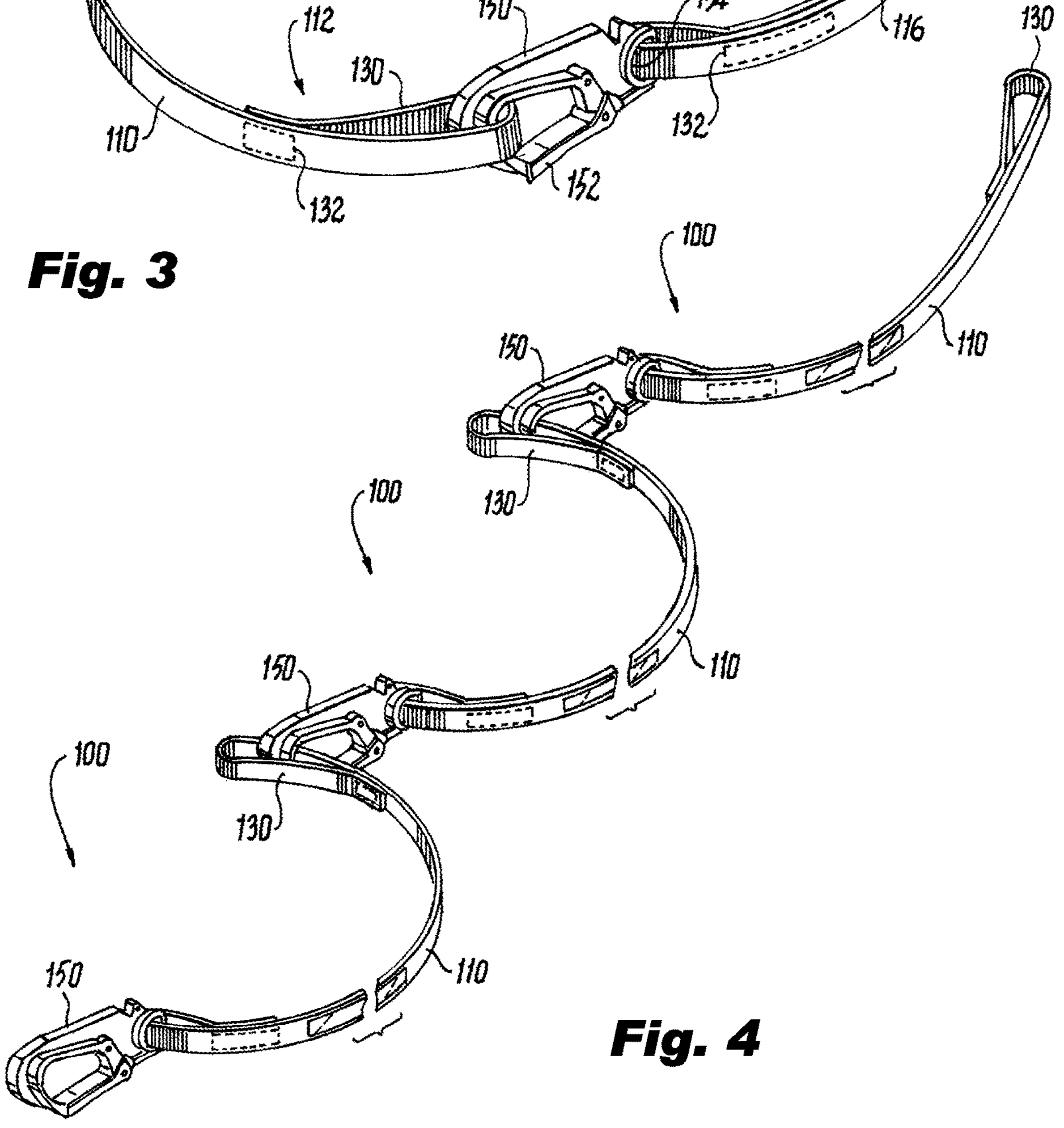
FIG. 4 is a front perspective view of a firefighter's utility device built in accordance with the present invention shown attached to a second and third unit of the same device.

The utility device 100 will be typically stored in the connected loop state depicted in FIG. 3. In this state, the utility device 100 is conducive to forming a girth hitch, as commonly used in extracting a victim from a dangerous environment. Further, in this state, the utility device 100 exhibits many of the valuable characteristics and possesses many of the same capabilities of a traditional webbing loop formed with a water knot.

In the connected loop state illustrated in FIG. 3, the utility device 100 essentially operates at half of its potential maximum length because the tether section 110 is effectively doubled up; that is, the outstretched length of the connected loop spans from the handle 130, where the fastener 150 is attached, to the middle of the tether section 110, and the second half of the tether section 110 spans from the middle of the tether section to the fastener 150, thus providing two strands of the webbing side by side. In some applications, it is advantageous to have the utility device 100 exhibit a longer length. In such scenarios, the effective length may be expanded by simply disengaging the fastener 150 from the handle 130 so that the utility device 100 embodies an elongated state, as depicted in FIG. 2. In this state, the utility device 100 can span approximately twice the length that it can in the connected loop state.

In the preferred embodiment, the outstretched length of the utility device 100 in the elongated state is substantially 22.00 feet and its outstretched length in the connected loop state is substantially 11.00 feet. With each member of a standard three-person team armed with such a utility device 100, they can link three units of the utility device 100 together in an end-to-end fashion by attaching the fastener 150 of a first utility device 100 to the handle 130 of a second utility device 100, and so on. Given the above-described dimensions, three joined units of the utility device 100 can extend 66.00 feet, thereby enabling them to reach the ground from the roof of a six-story building (six stories is a typical maximum limit for a non-fireproof structure in accordance with building codes).

Turning now to FIG. 6, in an alternate embodiment, the tether section 110 may comprise one or more fastening points along the length of the tether section 110 operative to receive the fastener 150. Rather than fastening the fastener 150 to the handle 130 to halve the length of the utility device 100 as described above, the fastener 150 may be fastened to one of the fastening points to selectively adjust the length of the utility device 100 in finer increments. Providing multiple fastening points along the length of the tether section 110 enables the utility device 100 to accommodate a wider array of options in setting its length.

Such a fastening point may comprise a small loop 120 operatively connected to the tether section 110, which in one embodiment is made of the same material as the tether section 110. As shown in FIG. 6, the loop may be formed by a length of material operatively connected at a first point along the length of material to a first point along the tether and at a second point along the length of material to a second point along the tether.

As another option, a hole 122 in the tether section 110 may serve as a fastening point, and such hole 122 may be reinforced with a rivet, a grommet, reinforced stitching or other methods known in the prior art to help prevent the hole from tearing and to minimize the effect such hole may have in compromising the integrity of the tether section 110. Other means known in the prior art for providing the fastening point at a desired position on the tether section 110 may alternatively be employed.

Admittedly, the tether section 110 of this embodiment may be less sleek than it is in the preferred embodiment, and may be prone to snagging objects or getting caught on various obstacles a firefighter may be presented with in the field. Nonetheless, the enhanced versatility afforded by the greater selectability in length of the utility device 100 may render this embodiment more desirable, especially in applications that benefit from the ability to fine tune the utility device's length.

When using embodiments of the utility device 100 having two fasteners 150 and 150' positioned at the distal end 114 of the tether section 110 as illustrated in FIG. 6, one of the fasteners 150 may be fastened to one of the fastening points to adjust the length of the utility device 100, leaving the other fastener 150' free for attaching the distal end 114 of the utility device 100 to a person or object in accordance with the invention's contemplated uses. The fastening points, such as the loops 120 and holes 122, also enable a user to attach additional great to the tether section 110, as indicated in FIG. 6 showing an additional fastener 150" attached to one of the loops 120.

The utility device 100 may be stored in a small storage case 160 for convenient transportation of the device, as shown in FIG. 1.

One or more components of the utility device 100, including but not limited to the tether section 110, the handle 130, and the fastener 150, may include retroreflective strips 102 or devices, or other reflective material, on their outer surface, as exemplified in FIGS. 2 and 3. It is appreciated that this may operate to improve the visibility of the utility device 100.

One or more components of the present invention, including the tether section 110 and any stitching thereon, the handle 130, and the fastener 150, may comprise equipment that meets the requirements approved and promulgated by the National Fire Protection Association Standards Council for life safety rope and associated equipment used to support emergency services personnel and civilians during rescue, firefighting, or other emergency operations, or during training.

There are copious additional uses for the invention described herein that, for brevity, have not been elaborated on, but which would be apparent to one of ordinary skill in the art. These include, but are not limited to, use as a search line, a utility line, a tie off, and a tool strap. Moreover, with multiple units of the utility device in play, it is possible to arrange them in such a manner to create a mechanical advantage when hoisting or dragging a load, such as a two to one mechanical advantage.

A person of ordinary skill in the art, and an experienced firefighter in particular, will immediately recognize the usefulness of such a device. Put simply, this utility device is an elegant solution to the problems posed by prior art rescue equipment and effectively overcomes their shortcomings. This tool, while relatively simple in design, is extraordinarily powerful when in the hands of a skilled firefighter trained in its use.

It is to be understood that the invention is not limited in its application to the details of construction and to the arrangements of the elements set forth in the accompanying description or illustrated in the drawings. The invention is capable of other embodiments and of being practiced and carried out in various ways. Also, it is to be understood that the phraseology and terminology employed herein are for the purpose of description and should not be regarded as limiting. The disclosure may readily be utilized as a basis for the designing of other structures, methods, and systems for carrying out the present invention. It is important, therefore, that the claims be regarded as including equivalent constructions. The abstract and the disclosure are neither intended to define the invention, which is measured by the claims, nor are they intended to be limiting as to the scope of the invention in any way.

What is claimed is:

1. A utility device, comprising:

a tether having a proximal end and a distal end, wherein the tether is formed from webbing having a planar top surface and a planar bottom surface;

a handle operatively connected to the proximal end of the tether, wherein the handle defines a loop formed by the proximal end of the tether;

a fastener operatively connected to the distal end of the tether, wherein the fastener has an opening dimensioned large enough for the tether to enter it and a closure mechanism configured to be selectably opened and closed, wherein the closure mechanism includes a gate that is spring-biased to a closed position;

wherein the tether further includes at least one fastening point configured for receiving the fastener and located at one or more points between the proximal end and the distal end of the tether; and wherein at least one of the at least one fastening point includes a loop formed by a length of material operatively connected at a first point along the length of material to a first point along the tether and at a second point along the length of material to a second point along the tether.

2. The utility device of claim 1, further comprising:

an auxiliary handle having a rigid, cylindrical gripping section and a fastener;

wherein the fastener is configured to selectably operatively connect to the handle.

3. The utility device of claim 1, wherein:

a circumference of the loop defined by the handle is at least 13.00 inches and at most 15.00 inches;

the width of the tether is at least 0.50 inches and at most 3.00 inches; and a total length of the utility device is at least 21.00 feet and at most 23.00 feet.

4. The utility device of claim 1, wherein at least one of the at least one fastening point includes a hole formed through the tether.

5. A utility device, comprising:

a tether having a proximal end and a distal end, wherein the tether is formed from webbing having a planar top surface and a planar bottom surface;

a handle operatively connected to the proximal end of the tether, wherein the handle defines a loop formed by the proximal end of the tether;

a fastener operatively connected to the distal end of the tether, wherein the fastener includes a captive eye carabiner having a gated compartment and a captive eye portion, and the gated compartment has an opening dimensioned large enough for the tether to enter it and a closure mechanism configured to be selectably opened and closed that includes a gate that is spring-biased to a closed position;

wherein the distal end of the tether passes through the captive eye portion of the captive eye carabiner and operatively connects to a more proximal location of the tether forming a loop at the distal end of the tether that is operatively connected to the captive eye portion of the captive eye carabiner;

wherein the tether further includes at least one fastening point configured for receiving the fastener and located at one or more points between the proximal end and the distal end of the tether; and wherein at least one of the at least one fastening point includes a loop formed by a length of material operatively connected at a first point along the length of material to a first point along the tether and at a second point along the length of material to a second point along the tether.

6. The utility device of claim 5, wherein:

a circumference of the loop defined by the handle is at least 13.00 inches and at most 15.00 inches.

7. The utility device of claim 6, wherein:

the width of the tether is at least 0.50 inches and at most 3.00 inches; and a total length of the utility device is at least 21.00 feet and at most 23.00 feet.

8. The utility device of claim 7, wherein the tether further includes retroreflective material on the planar top surface and planar bottom surface.

9. The utility device of claim 7, wherein:

the tether and the handle are formed from at least one of flame-resistant material and flame-retardant material; and the fastener has an exterior surface made up of non-corrodible material.

10. The utility device of claim 5, further comprising:

an auxiliary handle having a rigid, cylindrical gripping section and a fastener;

wherein the fastener is configured to selectably operatively connect to the handle.

11. The utility device of claim 5, wherein at least one of the at least one fastening point comprises a hole formed through the tether.

* * * * *